United States Patent Office 2,952,691
Patented Sept. 13, 1960

2,952,691

12α-HALO-Δ9(11)-PREGNENES

Josef Fried, New Brunswick, N.J., assignor to Olin Mathieson Chemical Corporation, New York, N.Y., a corporation of Virginia No Drawing. Filed Jan. 8, 1957, Ser. No. 632,978

11 Claims. (Cl. 260—397.3)

This invention relates to the synthesis of valuable steroids and has for its object the provision of: (I) an advantageous process of preparing steroids of the Δ9(11)-pregnene (including the allopregnene, pregnadiene and pregnatriene) series having a 12α-halogen substituent, and of (II) certain steroids useful themselves as physiologically active steroids.

The process of this invention essentially comprises converting a steroid of the pregnane (including allopregnane, pregnene and pregnadiene) series having a 12α-halogen substituent and an 11β-hydroxy substituent into the corresponding Δ9(11)-derivative.

The compounds of this invention comprise the 12α-halo-Δ9(11)-steroids of the pregnene (including the allopregnene, pregnadiene and pregnatriene) series and, in particular, steroids of the general formula

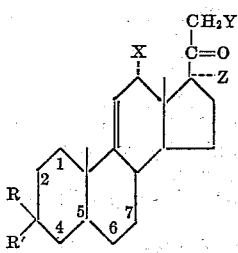

wherein the 1,2; 4,5; and 6,7-positions are double bonded or saturated (preferably the 4,5-position is double bonded, the 6,7-position is saturated, and the 1,2-position is either double bonded or saturated) and wherein individually R is hydrogen, R' is hydroxy or together R and R' is oxo (keto) or a group convertible thereto by hydrolysis (e.g., ketal) [preferably R and R' is keto]; X is halogen (preferably chlorine or fluorine); Z is hydrogen or α-hydroxy; and Y is hydrogen, hydroxy or acyloxy. If Y is acyloxy, the acyl group is preferably that of a hydrocarbon carboxylic acid of less than ten carbon atoms, as exemplified by the lower alkanoic acids (e.g., acetic, propionic and butyric acid), the monocyclic aryl carboxylic acids (e.g., benzoic and o-toluic acid), the monocyclic aralkanoic acids (e.g., phenylacetic and β-phenylpropionic acid), the cycloalkane carboxylic acids, the cycloalkene carboxylic acids and the lower alkenoic acids.

These compounds are prepared by interacting the corresponding 11β-hydroxy derivatives with an organic sulfonating agent, such as a lower alkane sulfonyl halide (e.g., mesyl chloride) or an aromatic sulfonyl halide (e.g., tosyl chloride) and an organic base, such as pyridine. The reaction is preferably conducted at an elevated temperature (e.g., a temperature in the range of about 50° C to about 100° C.) in the presence of an organic solvent of high polarity [e.g., a di(lower alkyl)-(lower alkanoyl)amide, such as N,N-dimethylformamide or diethyl-acetamide, a di(lower alkyl)sulfoxide, such as dimethyl sulfoxide, or a glycol, as as diethylene glycol].

Suitable starting materials utilizable in this process are disclosed in the U.S. applications of Josef Fried and Josef E. Herz, Serial No. 519,682, filed July 1, 1955; Serial No. 545,795, filed November 8, 1955; and Serial No. 576,259, filed April 5, 1956. Representative members of said materials include: the 21-esters of 12α-halohydrocortisones (e.g., 12α-fluorhydrocortisone 21-acetate); the 21-esters of 12α-halocorticosterones (e.g., 12α-chlorocorticosterone 21-acetate); 12α-halo-11β,17α-dihydroxyprogesterones; 12α - halo - 11β - hydroxyprogesterones (e.g., 12α-fluoro-11β-hydroxyprogesterone); the 21-esters of 12α - halo - 1 - dehydrohydrocortisones (e.g., 12α-fluoro-1-dehydrohydrocortisone 21-acetate); the 21-esters of 12α-halo-1-dehydrocorticosterones; 12α-halo - 1 - dehydro - 11β,17α - dihydroxyprogesterones; 12α-halo-1-dehydro-11β-hydroxyprogesterones; the 21-esters of 12α-halo-6-dehydrohydrocortisones; 12α-halo-6-dehydro-11β-hydroxyprogesterones; the 21-esters of 12α - halopregnane - 11β,17α,21 - triol - 3,20 - diones; 12α-halopregnane-11β-ol-3,20-diones; and the 21-esters of 12α-halo-allopregnane-11β,17α,21-triol-3,20-diones.

The compounds of this invention are physiologically active steroids which possess progestational activity. Hence, they can be used instead of progesterone, for example, in the treatment of habitual abortion, being administered for such purpose in the same manner as progesterone with dosage adjusted for the activity of the particular steroid.

The following examples illustrate the invention (all temperatures being in centigrade):

EXAMPLE 1

*12α-fluoro-9(11)-dehydroprogesterone*

To a solution of 100 mg. of 12α-fluoro-11β-hydroxyprogesterone in 2 ml. of dimethylformamide is added 0.2 ml. of pyridine and 0.2 ml. of methanesulfonyl chloride and the resulting mixture heated at 80° for one hour. After cooling to room temperature, ice-water is added and the resulting suspension extracted with chloroform. The chloroform extract is washed with dilute sulfuric acid, sodium bicarbonate and water, dried over sodium sulfate and evaporated to dryness in vacuo. The residue (about 100 mg.) is dissolved in 8 ml. benzene and 8 ml. hexane and the solution chromatographed on 2 grams of acid-washed alumina. Benzene-hexane 1:1 (400 ml.) elutes crystalline material (about 60 mg.) which after recrystallization from acetone-hexane furnishes pure 12α-fluoro-9(11)-dehydroprogesterone of the following properties: M.P. about 144–145°; $[\alpha]_D^{23}+205°$ (c., 0.63 in $CHCl_3$);

$\lambda_{max.}^{alc.}$ 237 mμ ($\epsilon=17,400$); $\lambda_{max.}^{Nujol}$ 5.83, 5.99, 6.10, 6.19μ

*Analysis.*—Calcd. for $C_{21}H_{27}O_2F$ (330.42): C, 76.33; H, 8.23. Found: C, 76.18; H, 8.15.

In a similar manner, when 12α-chloro-11β-hydroxyprogesterone is substituted for the 12α-fluoro-11β-hydroxyprogesterone in the procedure of Example 1, 12α-chloro-9(11)-dehydroprogesterone is obtained.

EXAMPLE 2

*12α-fluoro-Δ4,9(11)-pregnadiene-17α,21-diol-3,20-dione 21-acetate*

Following the procedure of Example 1, but substituting 12α-fluorohydrocortisone 21-acetate for the 12α-fluoro-11β-hydroxyprogesterone, there is obtained in good yield 12α-fluoro-Δ4,9(11)-pregnadiene-17α,21-diol-3,20-dione 21-acetate.

In the same manner, by substituting 12α-bromohydrocortisone 12-acetate and 12α-chlorohydrocortisone 21- acetate for the 12α-fluoro-11β-hydroxyprogesterone in the procedure of Example 1, 12α-bromo-Δ$^{4,9(11)}$-pregnadiene-17α,21-diol-3,20-dione 21-acetate and 12α-chloro-Δ$^{4,9(11)}$-pregnadiene-17α,21-diol-3,20-dione 21-acetate are obtained, respectively.

EXAMPLE 3

*12α-fluoro-Δ$^{4,9(11)}$-pregnadiene-17α,21-diol-3,20-dione*

A suspension of 100 mg. of 12α-fluoro-Δ$^{4,9(11)}$-pregnadiene-17α,21-diol-3,20-dione 21-acetate in 2 ml. of 0.27 N perchloric acid in methanol is shaken at room temperature for 16 hours. Water is added and the methanol removed in vacuo. The resultant crystals are filtered, washed with dilute sodium acetate solution and water, dried and recrystallized from 95% ethanol.

In a similar manner, other 21-esters can be converted to the free 21-hydroxyl derivatives.

EXAMPLE 4

*12α-fluoro-Δ$^{1,4,9(11)}$-pregnatriene-17α,21-diol-3,20-dione 21-acetate*

When 12α-fluoro-1-dehydrohydrocortisone 21-acetate is substituted for the 12α-fluoro-11β-hydroxyprogesterone in Example 1, 12α-fluoro-Δ$^{1,4,9(11)}$-pregnatriene-17α,21-diol-3,20-dione 21-acetate is produced.

Similarly, 12α-chloro-1-dehydrohydrocortisone 21-acetate yields 12α-chloro-Δ$^{1,4,9(11)}$-pregnatriene-17α,21-diol-3,20-dione 21-acetate.

EXAMPLE 5

*12α-fluoro-17α-hydroxy-9(11)-dehydroprogesterone*

Upon substituting 100 mg. of 12α-fluoro-11β,17α-dihydroxyprogesterone for the 12α-fluoro-11β-hydroxyprogesterone in the procedure of Example 1, there is obtained 12α-fluoro-17α-hydroxy-9(11)-dehydroprogesterone.

Similarly, 12α-chloro-11β,17α - dihydroxyprogesterone and 12α-bromo-11β,17α-dihydroxyprogesterone yield 12α-chloro-17α-hydroxy-9(11)-dehydroprogesterone and 12α-bromo-17α-hydroxy-9(11)-dehydroprogesterone, respectively.

EXAMPLE 6

*12α-fluoro-Δ$^{4,9(11)}$-pregnadiene-21-ol-3,20-dione 21-acetate*

By substituting 100 mg. of 12α-fluorocorticosterone 21-acetate for the 12α-fluoro-11β-hydroxyprogesterone in the process described in Example 1, 12α-fluoro-Δ$^{4,9,(11)}$-pregnadiene-21-ol-3,20-dione 21-acetate is prepared.

The invention may be otherwise variously embodied within the scope of the appended claims.

I claim:
1. A compound selected from the group consisting of steroids of the general formulae

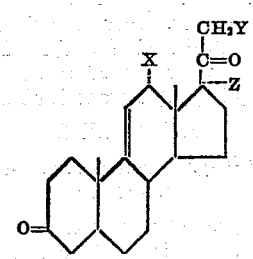

and

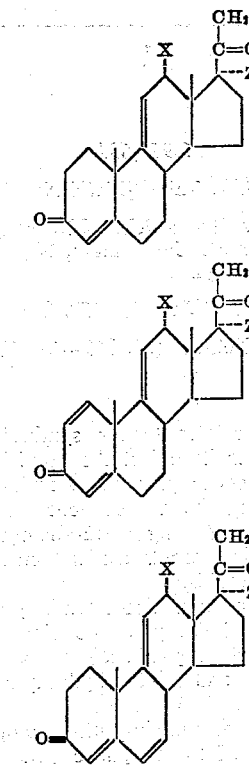

wherein X is halogen, Z is selected from the group consisting of hydrogen and α-hydroxy, and Y is selected from the group consisting of hydrogen, hydroxy and acyloxy, wherein the acyl radical is that of a hydrocarbon carboxylic acid of less than ten carbon atoms.

2. 12α-halo-9(11)-dehydroprogesterone.
3. 12α-fluoro-9(11)-dehydroprogesterone.
4. A 21-ester of 12α-halo-Δ$^{4,9(11)}$-pregnadiene-17α,21-diol-3,20-dione with a hydrocarbon carboxylic acid of less than ten carbon atoms.
5. 12α-fluoro-Δ$^{4,9(11)}$-pregnadiene-17α,21-diol-3,20 - dione 21-acetate.
6. A 21-ester of 12α-fluoro-Δ$^{1,4,9(11)}$-pregnatriene-17α,21-diol-3,20-dione with a hydrocarbon carboxylic acid of less than ten carbon atoms.
7. 12α-fluoro-Δ$^{1,4,9(11)}$-pregnatriene-17α,21-diol-3,20-dione 21-acetate.
8. 12α-halo-17α-hydroxy-9(11)-dehydroprogesterone.
9. 12α-fluoro-17α-hydroxy-9(11)-dehydroprogesterone.
10. An ester of 12α-halo-Δ$^{4,9(11)}$-pregnadiene-21-ol-3,20-dione with a hydrocarbon carboxylic acid of less than ten carbon atoms.
11. 12α-fluoro-Δ$^{4,9(11)}$-pregnadiene-21-ol-3,20-dione 21-acetate.

References Cited in the file of this patent
UNITED STATES PATENTS

| | | |
|---|---|---|
| 2,628,240 | Levin et al. | Feb. 10, 1953 |
| 2,649,402 | Murray et al. | Aug. 18, 1953 |
| 2,662,854 | Miescher et al. | Dec. 15, 1953 |
| 2,769,825 | Schneider et al. | Nov. 6, 1956 |
| 2,782,211 | Wettstein et al. | Feb. 19, 1957 |
| 2,814,629 | Fried et al. | Nov. 26, 1957 |
| 2,914,545 | Herz et al. | Nov. 24, 1959 |

OTHER REFERENCES

Fieser and Fieser: Natural Products Related to Phenanthrene, 3rd Edition (1949), pages 242 and 454.